United States Patent [19]
Weider

[11] 3,877,579
[45] Apr. 15, 1975

[54] ADJUSTABLE CONNECTOR FOR STRUCTURAL MEMBERS
[75] Inventor: John J. Weider, Arlington Heights, Ill.
[73] Assignee: Speedrack Inc., Skokie, Ill.
[22] Filed: Mar. 21, 1974
[21] Appl. No.: 453,198

[52] U.S. Cl. ............... 211/176; 211/177; 211/182; 248/243; 403/178
[51] Int. Cl. .............................................. A47f 5/10
[58] Field of Search............ 52/758 R; 108/111, 153; 211/148, 176, 177, 182, 183; 248/188.2, 188.4, 235, 243–245, 248, 274, 288, 295, 354 R, 354 P, 354 S

[56] References Cited
UNITED STATES PATENTS

| 1,141,057 | 5/1915 | Heltzel | 52/758 R |
| 1,299,234 | 4/1919 | Russell | 248/244 |
| 1,590,064 | 6/1926 | Seaman | 52/758 R |
| 2,379,752 | 7/1945 | Schultz | 248/235 |
| 3,184,207 | 5/1965 | Hermanns et al. | 211/182 |
| 3,229,994 | 1/1966 | Klein | 211/176 |
| 3,368,690 | 2/1968 | Konstant | 52/758 R |
| 3,523,613 | 8/1970 | Konstant | 211/182 |
| 3,527,436 | 9/1970 | Stone et al. | 248/188.4 |
| 3,561,714 | 2/1971 | Zurawski | 248/243 |
| 3,632,146 | 1/1972 | Buzby et al. | 211/177 |

FOREIGN PATENTS OR APPLICATIONS

| 756,900 | 4/1967 | Canada | 211/177 |
| 446,645 | 3/1968 | Switzerland | 211/176 |
| 1,429,555 | 12/1968 | Germany | 248/295 |

Primary Examiner—Roy D. Frazier
Assistant Examiner—Lawrence J. Staab
Attorney, Agent, or Firm—Fitch, Even, Tabin & Luedeka

[57] ABSTRACT

A connector for interconnecting a structural member and a column having parallel surfaces containing aligned holes at spaced vertical intervals. The structural member may be an angle or channel shape having elongated slot means in one wall. One bolt extends through aligned holes in the column and through the slot where a lock nut is threaded. An L-shaped bolt has one leg inserted through aligned holes in the column and the slot means and carries a similar lock nut. An apertured clip is supported on the other leg by a nut and engages a horizontal edge of another wall of the structural member. Adjustment of the nut effects precise changes in the relative vertical alignment of the column and the structural member, and by tightening the lock nuts, the column is clamped between the clip and the slotted wall.

10 Claims, 3 Drawing Figures

ADJUSTABLE CONNECTOR FOR STRUCTURAL MEMBERS

This invention relates to the interconnection of structural members and more particularly to a connection for achieving a precise vertical alignment between a storage rack column or the like and another structural member.

U.S. Pat. No. 2,932,368, issued Apr. 12, 1960, discloses a storage rack arrangement wherein the beams are adjustably mounted to the columns using a particularly effective lock arrangement. The lock arrangement employs locking pins which fit through aligned holes that are provided in vertical rows on the columns at the desired spaced intervals, commonly about two inches apart. This arrangement permits a beam to be located within about an inch of any desired horizontal level and is generally fully adequate to meet most storage rack needs. However, in certain specialized storage installations, even more precise location of beams may be needed, and accordingly more versatile connectors for structural members are desired.

It is an object of the present invention to provide a connector which is designed to facilitate the interconnection of a column and another structural member with any desired relative vertical alignment. It is another object of the invention to provide a storage rack wherein the beams can be located upon the columns at any precise height. A further object of the invention is to provide a connector for achieving infinite vertical adjustment between a column and another structural member connected therewith. Still another object is to provide a storage rack having an interconnected footing or roof support which is capable of infinite vertical adjustment therebetween. These and other objects of the invention will become apparent from the following detailed description of certain preferred structures embodying various features of the invention when read in conjunction with the appended drawings wherein:

FIG. 3 is a partial perspective view, enlarged in size, of the connection between the column and a roof support shown in FIG. 1.

Figure 1:
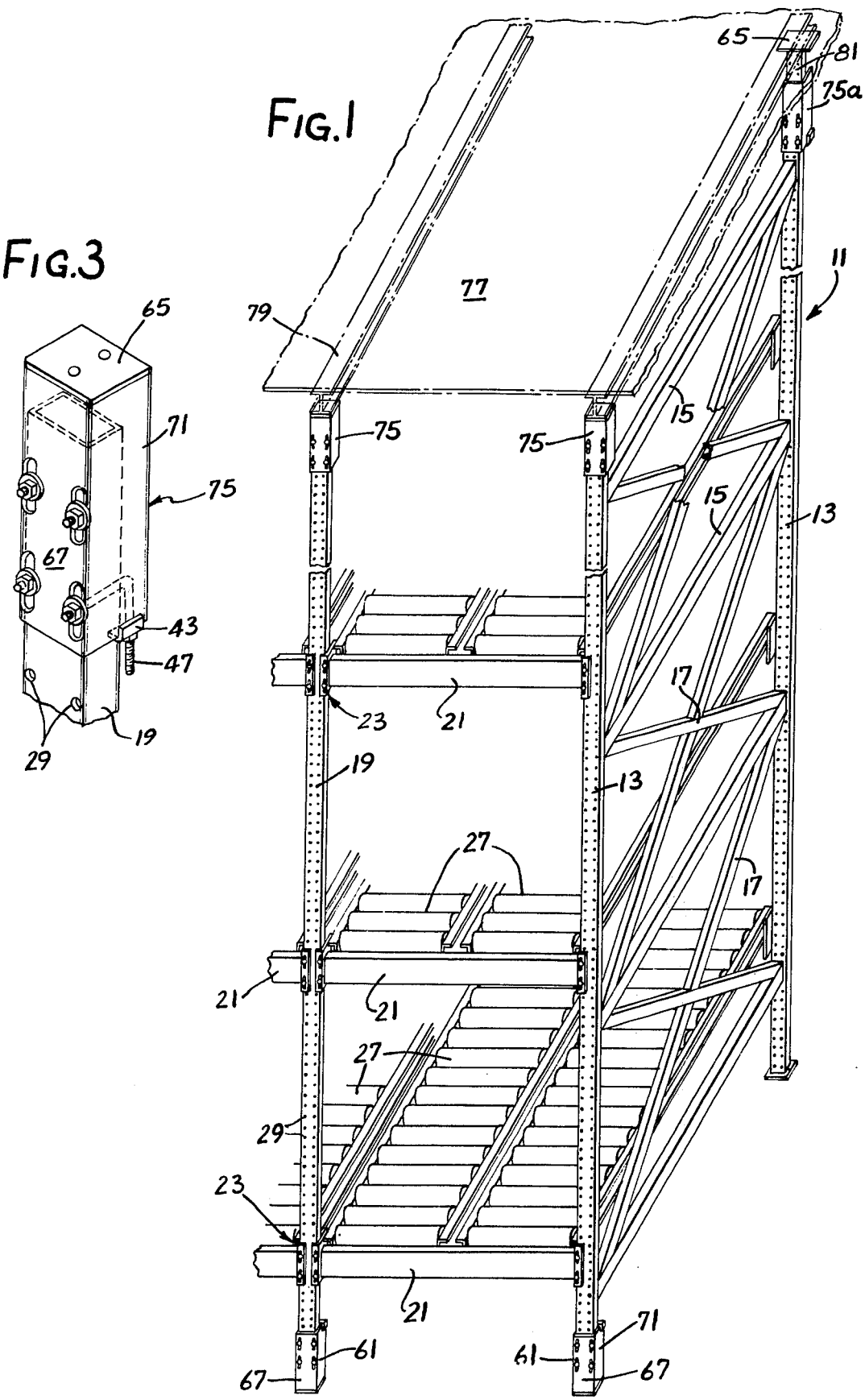
FIG. 1 is a perspective view of a selective storage rack installation utilizing roller conveyors in the individual storage bays, which installation employs adjustable connections with the columns embodying various features of the invention.

Illustrated in the drawings is a storage rack installation of the general selective rack type illustrated in aforementioned U.S. Pat. No. 2,932,368, the disclosure of which is incorporated herein by reference. This installation includes upright trusses 11 which are formed by pairs of spaced apart vertical columns or uprights 13 which are interconnected via horizontal spacers 15 and cross bracing 17 suitably welded thereto. Aligned with the columns 13 of the truss 11 are individual vertical columns 19 which are horizontally spaced therefrom the distance of a desired storage rack bay. The spaced columns are interconnected by horizontal load-carrying beams 21 which are approximately interconnected at the desired vertical level upon the columns by connectors or locks 23. Some of the connections between the beams 21 and the vertical columns may be made using the standard structural locks disclosed in the aforementioned U.S. patent, for example, those connections with the rear column in the truss 11 and with the other columns aligned therewith. However, connections embodying various features of the invention are illustrated as joining the forwardmost horizontal beams 21 to the vertical columns.

The beams 21 are formed generally in accordance with the teaching of U.S. Pat. No. 3,726,414, issued Apr. 10, 1973, so as to have an intermediate level shelf 25 which in the illustrated installation is employed to support one end of roller conveyor sections 27. In the illustrated installation, pairs of roller conveyor sections 27 are located side-by-side in each storage bay running fore-and-aft therein. The storage rack bays may be one, two or more upright trusses 11 deep, and the roller conveyor sections 27 are sized accordingly for proper length. In this type of installation, the goods being stored are usually arranged for a first-in, first-out sequence, with the packages or palletized units being fed into the front of the storage bay and removed from the rear end thereof. FIG. 1 is meant to depict the conveyor sections 27 being inclined slightly rearward. It is considered important to have a fairly precise incline on the roller conveyor sections 27, and to achieve this the illustrated connectors 23 are used to provide infinitely variable vertical adjustment.

Figure 2:
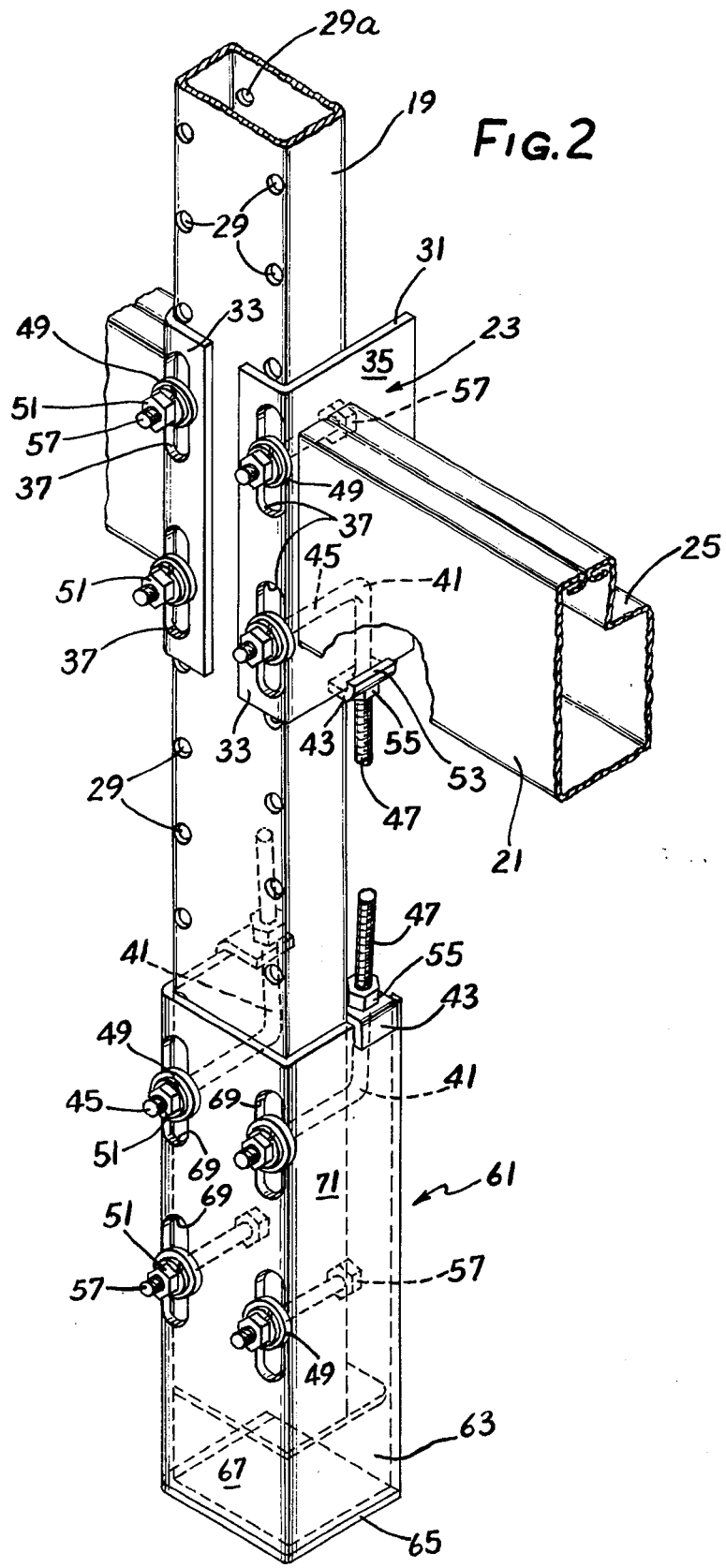
FIG. 2 is an enlarged fragmentary perspective view, with certain portions broken away, illustrating particularly the infinitely vertically adjustable interconnections with a beam and a footing.

The columns 13, 19 are provided with rows of vertically spaced holes 29 along the side edges of the front surface thereof. In the illustrated embodiment, the columns 19 are tubular and have horizontally aligned holes 29a (FIG. 2) in the rear surface thereof. Columns of other design having such parallel surfaces may also be used; for example, generally C-shaped columns may be employed.

The connector 23 includes a plate member 31 which is suitably attached, as by welding, to one end of the horizontal beam 21. The plate member 31 has two walls 33, 35 disposed at right angles to each other, with the narrower front wall 33 having a pair of elongated slots 37 and the main wall 35 being joined to the end of the beam 21.

The precise vertical adjustment of the plate member 31, and thus the beam height, is achieved via the use of an L-shaped bolt 41 and a clip 43 which engages the horizontal lower edge of the main wall 35 of the plate member 31. The L-bolt 41 has two legs 45, 47 disposed generally at right angles to each other, the ends of which are threaded.

The leg 45 is inserted through aligned holes 29 in the front and rear surfaces of the column 19 so that the threaded end protrudes from the front surface at the approximately desired vertical level for the bottom edge of the beam 21. The beam with the attached plate member 31 is then positioned in engagement with the column 19 so that the threaded end of the leg 45 of the L-bolt protrudes through the lower elongated slot 37. A serrated washer 49 and a locknut 51 are then placed loosely on the protruding end of the leg 45.

The clip 43 contains an aperture therein slightly larger than the diameter of the other leg 47 of the L-bolt, and it has a short lip 53 which is disposed at right angles to the apertured portion so that it wraps slightly around the bottom edge of the main wall 35 of the plate member 31. By threading a locknut 55 upward on the depending threaded leg 47, the clip 43 is forced upward, gradually raising the plate 31 and the attached beam 21 to the precise desired vertical height. Once the desired beam height is reached, tightening the locknut 51 on the horizontal leg 45 of the L-bolt causes a clamping action to occur which holds the connector 23 in precisely this location. The tightening action forces the short front wall 33 of the connector against the front face of the column 19 while drawing the side edge of the clip 43 tightly against the rear surface of the column 19. In addition, the provision of the serrated washer 49 provides a positive grip at a precise vertical location on the portion of the short wall 33 of the plate member 31 just outside the periphery of the lower slot 37.

The upper slot 37 is of sufficient length so that it is in registration with another aligned set of holes 29, and a simple hex-head bolt 57 is inserted through these holes. The threaded end of the bolt 57 protrudes through the upper slot 37, and a serrated washer 49 and a locking nut 51 are similarly attached thereto, as on the threaded horizontal leg 45 of the L-bolt. The provision of this separate upper bolt 57 provides spaced points of attachment which greatly stabilize the overall connection and which are considered important for storage rack structures wherein heavy loads will be carried so that rigidity is of prime importance. However, it can be seen that many of the advantages of the invention can be obtained by relying upon the L-bolt 41 for the adjustment and stabilizing.

Inasmuch as the upright trusses 11 are made of standard configuration and designed for level floors, some difficulty may be encountered when a storage rack installation is utilized in a warehouse or plant area wherein the floor is not level. This is often the case in installations, such as packing houses or former packing houses, wherein the floors were designed with a substantial slope or grade so that frequent washing with water and drainage would be facilitated. Thus, if the usual storage rack installation is erected on such a sloping floor, and if no alterations are made, the columns may incline substantially from the vertical, thus reducing the overall stability of the storage rack array, particularly if it is designed to be free-standing. The connector arrangement provided by the invention presents a simple solution to this problem.

FIG. 1 illustrates an installation wherein there is a substantial forward incline to the floor so that the rear column of the upright 11 is at a higher vertical level than the front column. In order to raise the front column 13 to the same vertical level, a channel-shaped structural member or footing 61 is provided. The footing 61 includes a channel section 63 of sufficient proportion to fit about and envelope the column 13, 19 plus a lower base plate 65 which is suitably welded thereto and may contain one or more holes (not shown) by which it can be secured to the floor after the erection of the rack installation is complete. The web 67 of the channel contains a pair of elongated slots 69 formed along both side edges thereof, and the flanges 71 of the channel are sufficiently deep to extend past the rear surface of the column 13, 19.

As illustrated, a pair of L-bolts 41 are preferably employed so as to adequately carry the anticipated loading and reduce the possibility of binding; however, the relative vertical adjustment could be obtained by a single L-bolt. The assembly of the connector arrangement is similar to that described above, except for the fact that the legs 47 of the L-bolts 41 extend generally upward rather than downward. Preferably, the footings 61 are attached to the lower ends of the appropriate columns 13, 19 before erection and are precisely adjusted thereafter.

As one example, the two bolts 57 and the legs 45 of the two L-bolts may be inserted through the appropriate aligned holes 29 in the lower portion of the column so that the four threaded ends protrude through the four elongated slots 69 in the footing 61. Four serrated washers 49 and four locking nuts 51 are then loosely installed, and the clips 43 and locknuts 55 are placed on the threaded upward ends of the legs 47. Once erection is completed, the locknuts 55 on the upper legs are turned until the columns 13, 19 are raised to the precise height desired, and then the four locknuts 51 adjacent the front face of the web 67 are tightened to press the serrated washers 51 into clamping engagement.

Illustrated in enlarged detail in FIG. 3 is a roof support 75 which has the same channel-like structure as the footing 61 but is used in upside-down orientation, being joined to the upper end of the column 19. The roof support 75 provides for desired interconnection with an overhead roof 77 or a roof longitudinal beam 79 that is not horizontal (shown in broken lines). The legs 47 of the L-bolts point generally downward, and the clips 43 engage the bottom edge of the flange 71, in the same manner as in the illustrated beam connector 23. Moreover, instances wherein a sloping or shed-type roof might be encountered are perhaps more numerous than where a greatly inclined floor is encountered and accordingly the employment of the channel-like structural members 75 in such a roof interconnection may occur more frequently. In the illustrated installation, the roof 77 slopes forward, and a rear roof support 75a is provided having a short extension 81 welded thereto which carries the base plate 65.

The invention provides a relatively simple, but effective and easily installed connector for achieving precise relative vertical alignment between structural members. Columns having such rows of aligned vertically spaced holes have become commonplace in today's storage rack field, and the invention utilizes such standardized hole patterns to achieve infinite vertical adjustment without alteration. Although various modifications have been described herein, it should be understood that other modifications and changes which would be obvious to one having the ordinary skill in this art may be made without deviating from the scope of the invention which is defined by the appended claims.

Various of the features of the invention are set forth in the claims which follow.

What is claimed is:

1. A storage rack structure or the like including a column to which a structural member is attached, said column having first and second generally parallel surfaces which surfaces have aligned holes located at spaced vertical intervals, said structural member including first and second walls disposed generally at right angles to each other and having elongated slot means in said first wall, bolt means extending through aligned holes and through said slot means, locking nut means mated with said bolt means and holding said first wall in tight contact with said first surface, generally L-shaped connecting means including first and second legs having threaded ends, said first leg extending through aligned holes with its free end protruding through said slot means and said second leg extending past a generally horizontal edge of said second wall, an apertured clip carried by said second leg and engaging said horizontal edge of said second wall, and nut means in threaded connection with each said threaded end, whereby adjustment of said nut means on said second leg moves said clip and effects precise changes in the relative vertical alignment of said column and said structural member and whereby thereafter tightening of said nut means on said first leg clamps said column between said clip and said slotted first wall.

2. The invention in accordance with claim 1 wherein said second wall of said structural member is affixed to one end of a horizontal beam.

3. The invention in accordance with claim 1 wherein serrated washers are located between said slotted first wall and said nut means adjacent thereto.

4. The invention in accordance with claim 1 wherein said clip includes a right angle lip which lies horizontally adjacent said second wall.

5. The invention in accordance with claim 1 wherein said structural member includes a channel section which extends vertically past the end of said column and constitutes an extension thereof.

6. The invention in accordance with claim 5 wherein said structural member is a roof support and said second leg extends downward past the bottom edge thereof.

7. The invention in accordance with claim 5 wherein said structural member is a footing support and said second leg extends upward past the top edge thereof.

8. A connector for interconnecting a structural member and a column which has first and second generally parallel surfaces having aligned holes in said surfaces at spaced vertical intervals, and said structural member including first and second walls disposed generally at right angles to each other and having elongated slot means in said first wall, said connector comprising bolt means extending through aligned holes and through said slot means, and locking nut means mating with said bolt means and holding said first wall in tight contact with said first surface, generally L-shaped connecting means having a pair of legs with threaded ends, a first leg being inserted through the aligned holes with the free end thereof protruding through said slot means, an apertured clip carried by a second leg of said connecting means and engaging a horizontal edge of said second wall and nut means in threaded connection with each said threaded end, whereby adjustment of said nut means on said second leg effects precise changes in the relative vertical alignment of said column and said structural member, and whereby tightening of said nut means on said first leg thereafter clamps said column between said clip and said slotted first wall.

9. The invention in accordance with claim 8 wherein said structural member includes a channel section which is proportioned to fit about said column.

10. The invention in accordance with claim 8 wherein said clip includes a right angle lip which lies horizontally adjacent said second wall.

* * * * *